United States Patent [19]

Steffy

[11] Patent Number: 4,711,417
[45] Date of Patent: Dec. 8, 1987

[54] APPARATUS FOR EJECTION OF A SPACECRAFT

[75] Inventor: David A. Steffy, Hawthorne, Calif.

[73] Assignee: Hughes Aircraft Company, Los Angeles, Calif.

[21] Appl. No.: 780,532

[22] Filed: Sep. 26, 1985

[51] Int. Cl.$^4$ ............................................. B64G 1/22
[52] U.S. Cl. .............................. 244/158 R; 244/137.1
[58] Field of Search ........... 244/158 R, 137 A, 137 R; 89/151, 158, 159; 124/16

[56] References Cited

U.S. PATENT DOCUMENTS 3,815,849  6/1974  Meston ............................ 244/137 R
4,303,214  12/1981  Wittmann ...................... 244/158 R Primary Examiner—Galen Barefoot
Attorney, Agent, or Firm—S. M. Mitchell; M. J. Meltzer; A. W. Karambelas

[57] ABSTRACT

Apparatus and a method for deploying a spacecraft into orbit from a launching vehicle is provided. The apparatus includes a pivot support assembly having a pivot seat member contacting the spacecraft on the opposite side of its center of mass relative to the application of an ejecting force. The pivot seat member is biased against the stop member with a directional force which is less than the maximum force capable of being exerted on the seat member during the takeoff of the launching vehicle from earth but greater than the force exerted on the seat member during deployment. The biasing member can be a form of spring such as a torsion bar.

21 Claims, 8 Drawing Figures

APPARATUS FOR EJECTION OF A SPACECRAFT

BACKGROUND OF THE INVENTION

1. Field of the Invention

This invention relates to the ejection of a spacecraft from a launching vehicle and more particularly to an improvement in the gyroscopic ejection of a spacecraft.

2. Description of the Prior Art

Spacecraft such as satellites have been deployed with linear and angular velocity from a launching vehicle such as the NASA Space Transportation System, i.e., Space Shuttle, successfully. An example of such a spacecraft is disclosed in U.S. Pat. No. 4,326,684, which is particularly adapted for mounting within a cradle positioned within a bay of the Space Shuttle. The specific construction of the cradle can be seen, for example, in U.S. Pat. Nos. 4,324,374 and in 4,303,214.

U.S. Pat. No. 4,290,570 describes the mechanism by which a spacecraft is removably attached to the open ended cradle. U.S. Pat. No. 4,300,737 describes locking mechanisms in the cradle that can be remotely controlled for locking and relocking the spacecraft. The manner in which the spacecraft is deployed with linear and angular velocity is disclosed in the above reference and in U.S. Pat. No. 4,359,201. Finally, U.S. Pat. No. 4,213,586 is of general interest.

The spacecraft is attached to the cradle and is restrained during the initial takeoff and transportation of the launching vehicle into space. When the launching vehicle has reached its parking orbit, the attitude of the spacecraft will be set by the attitude of the shuttle and this attitude is maintained during ejection from the shuttle by simultaneously imparting both linear and angular momentum to the spacecraft. This spin provides a gyroscopic stabilization.

In the launching mode, the payload bay doors are opened on the Space Shuttle, and release mechanisms between the cradle and the spacecraft, such as pyrotechnically activated release mechanisms, are fired. A preloaded ejection spring can cause a spacecraft to rise and rotate until the outboard pivots on one side of the spacecraft contact pivot seat members or pads mounted on the cradle. This pre-ejection movement continues until an anchor rod or tether reaches its stop. After settling for a few minutes to eliminate nutations, an ejection mechanism, such as a spring, is activated so that a pivot or pair of pivots on the other side of the spacecraft define an axis of rotation about which the spacecraft will accumulate its angular rate. The rotation of the spacecraft provides sufficient gyroscopic stability to maintain attitude until the spacecraft reaches a predetermined distance from the orbiting launching vehicle. A perigee kick motor can be fired to launch the satellite to an operating orbit.

An advantage of this type of ejection or launching of a spacecraft from the launch vehicle is that it is relatively simple and that it does not require any active control of the spacecraft prior to the firing of the perigee propulsion stage. The cradle remains with the launching vehicle and, when mounted on a reusable launching vehicle such as the Shuttle, may be reused for subsequent launches of spacecraft.

The payload bay of the Space Shuttle is approximately 15 feet in diameter and 60 feet long and it is capable of carrying 65,000 pounds. The dimensions of the payload bay of the space shuttle and the high cost per pound of orbiting a spacecraft has imposed certain limitations on the dimensions of the spacecraft to be launched from the Space Shuttle and on the construction of the cradle to support these spacecraft. In this regard, some designs of spacecraft require a certain cantilevered support from the cradle while the actual construction of the cradle must be within strict weight limitations. These design limitations, plus the hostile environment of space, provide inherent problems in establishing a stable support structure to permit relative movement of the spacecraft during launching.

Accordingly, there is still a demand in the prior art and it is expected there will be a continued demand to provide further improvements in deployment systems and support structure for spacecraft to be deployed from a launching vehicle. The unique limitation of forces exerted during the initial takeoff of the launching vehicle from earth, the extreme limitations on weight, the drastic temperature changes, plus the constraints of providing relatively simple fail safe mechanisms will continue to challenge the abilities of designers in this field.

SUMMARY OF THE INVENTION

The present invention provides an improved spacecraft deployment system for the controlled release of a spacecraft such as a satellite into outer space from a launching vehicle such as a Space Shuttle. A cradle support structure is mounted in the payload bay of a launching vehicle for releasably supporting the spacecraft. The spacecraft is releasably restrained to the supporting structure. The supporting structure can carry an ejecting device, such as a spring mechanism, capable of imparting a tangential thrust force on one side of the center of mass of the spacecraft. A pivot support assembly is mounted on the other side of the center of mass of the spacecraft, so that a rotary movement about the pivot point is imparted for gyroscopic stability during the initial deployment phase. The pivot seat member is movably mounted on the cradle as a launching support structure. Limiting stops are provided to limit the movement of the seat member, while a biasing mechanism, such as a spring, can bias the force of the seat member against the stop limits so that the pivot seat member can move if contacted with excessive forces from the spacecraft during the launching or takeoff of the launching vehicle. The biasing device such as the spring, however, generates sufficient force so that it is greater than any force capable of being exerted on the pivot seat member during the ejection of the spacecraft from the launch vehicle. As a result, the seat member can move against the biasing device and away from the stop during takeoff but will remain relatively rigid against the stop during the ejection of the spacecraft from the launching vehicle into outer space and thereby provide a necessary rigid platform for the deployment of the spacecraft.

In an alternative embodiment of the present invention, a torsion bar can be utilized to provide the biasing force to accomplish the purposes of the present invention.

BRIEF DESCRIPTION OF THE DRAWINGS

The invention, including its various objects, features and advantages, may be more readily understood with reference to the following detailed description of the embodiments thereof, taken in conjunction with the accompanying drawings, wherein like reference numbers designate like structural elements.

DESCRIPTION OF THE PREFERRED EMBODIMENTS

The following description is provided to enable any person skilled in the art to make and use the invention, and sets forth the best modes contemplated by the inventor of carrying out his invention. Various modifications, however, will remain readily apparent to those skilled in the field, since the generic principles of the present invention have been defined herein specifically to provide a relatively economical and easily manufactured deployment apparatus for the gyroscopic ejection of a spacecraft.

Figure 1:
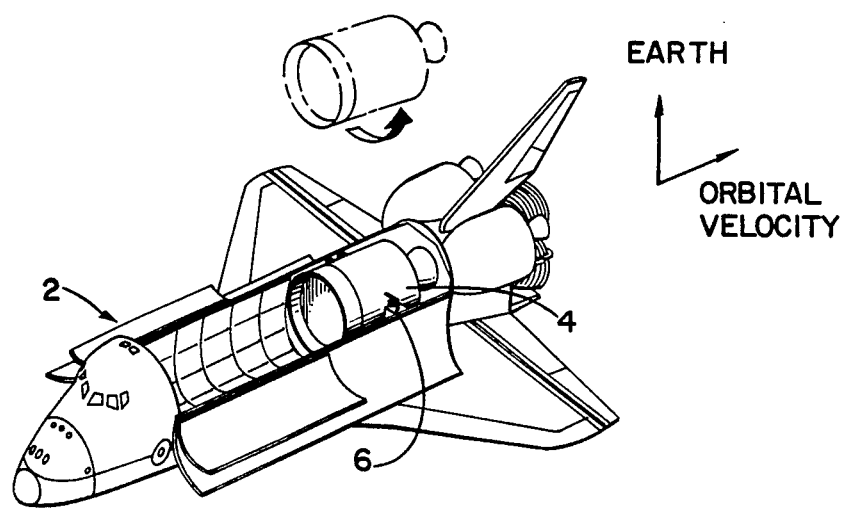
FIG. 1 is a drawing of a Space Shuttle showing the payload bay doors open with a spacecraft in a supporting cradle mounted thereon.
Figure 4:
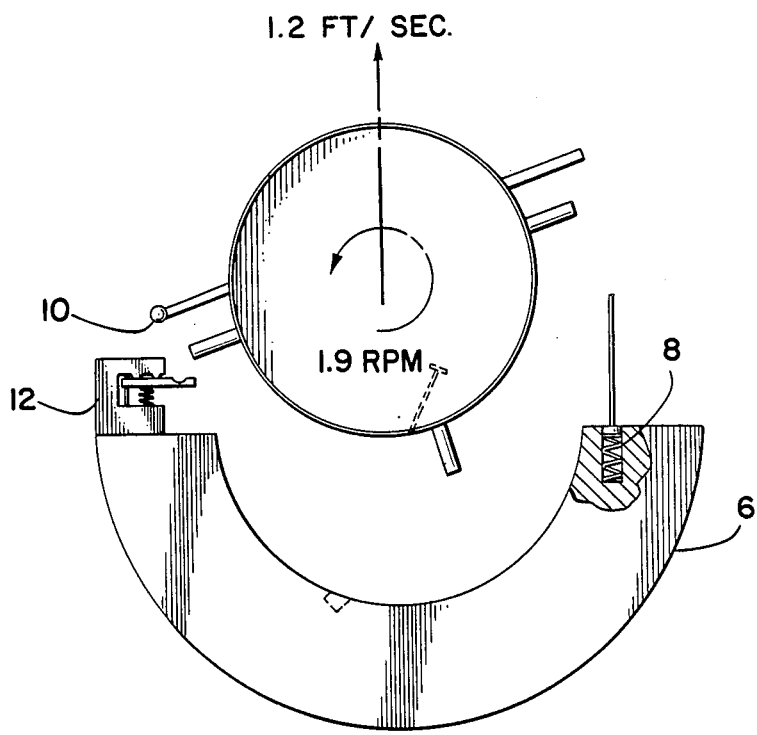
FIG. 4 is a schematic view from the front of the bay showing the launching of the spacecraft from the cradle.

Referring to FIG. 1, a perspective view of a launching vehicle 2, such as the Space Shuttle developed by the National Aeronautics and Space Administration (NASA), is shown with its payload bay doors open. A spacecraft 4 such as a geostationary satellite is positioned in the shuttle's bay. As can be seen in FIGS. 1 and 4, the spacecraft 4, can be deployed with linear and angular velocity and such a deployment is shown in the phantom line shown in FIG. 1. While the NASA space transportation system (STS), Space Shuttle, is depicted in FIG. 1, it should be appreciated that the present invention can be used in other launch vehicles wherein a spacecraft is initially ejected and subsequently receives additional propulsion impulses to launch, for example, a geostationary satellite to its orbit of approximately 19,300 nautical miles. Thus, at the time of an equatorial crossing, a first impulse can impart a velocity increment of approximately 8,000 fps at the perigee of elliptical transfer orbit. At the appropriate apogee of the transfer orbit, the second impulse can provide a velocity increment of 6,000 fps, both for circling the orbit and removing the inclination. The present invention is directed to the initial release of the spacecraft from the launch vehicle preparatory to the subsequent propulsion impulses to achieve the desired orbit, such as a geostationary satellite.

Figure 2:
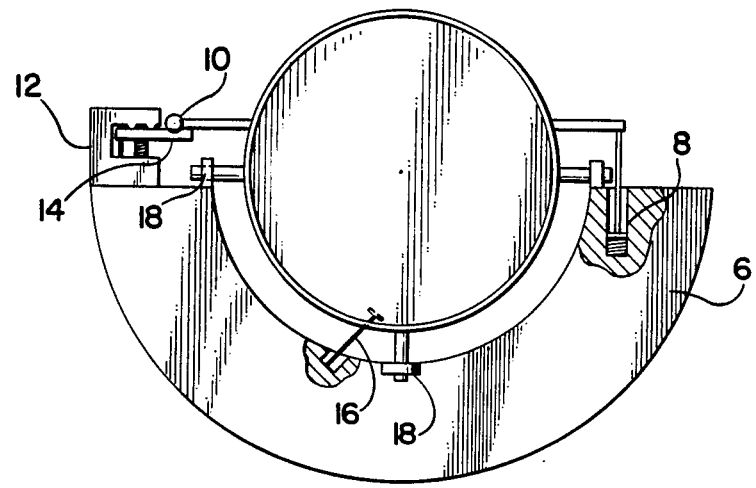
FIG. 2 is an elevated view from the front of the bay in a schematic illustration of the spacecraft and cradle.

Referring to FIG. 2, a support structure in the form of a cradle 6 supports the spacecraft which, for purposes of the description of the present invention, can be assumed to be a satellite and/or a carrier assembly that can carry propulsion motors that would be jettisoned prior to reaching the operating orbit.

The cradle 6 not only supports the spacecraft/carrier assembly, but further provides the structural, electrical and avionics interfaces to the orbiter. The cradle 6 also contains the ejecting mechanism 8 that ejects the spacecraft from the cargo bay in a Frisbee style, for example, imparting both a translation movement in the order of 1.2 feet per second and a rotational movement in the order of 1.9 rpm. The specific translational and rotational movements will be subjectively determined depending on the specific design parameters of the spacecraft. The cradle is generally a lightweight structure, for example, of an aluminum box and beam configuration to provide good structural stiffness at a minimum weight. The cradle 6 can be designed to use the structure of the spacecraft to provide required stiffness, thereby minimizing the cradle weight. Accordingly, a greater amount of weight can be allocated to the spacecraft for the same total launch weight. The structure of the spacecraft can provide a structural tie between the two ends of the U-shaped cradle and the keel. This tie can increase the overall stiffness of the integrated system. In order to provide the required stiffness, the structure of the spacecraft can be designed as a thrust structure which provides the load path continuity between parts of the cradle. The specific trunnions and their operation can be seen from the prior art, such as U.S. Pat. No. 4,300,737, the subject matter which is incorporated herein by reference and it is deemed not necessary to republish this disclosure material in the present application since it does not form an essential part of the present invention.

Figure 3:
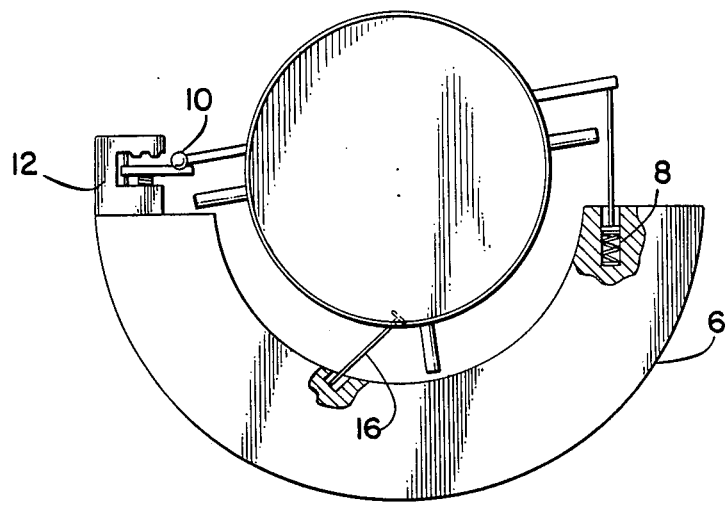
FIG. 3 is a schematic view from the front of the bay showing the position of the spacecraft after the release mechanisms have been fired.

Generally five cradle release mechanisms 18 are attached to struts which can be bolted into the cradle bulkheads. These restraining mechanisms carry the principal weight of the spacecraft and hold it firmly to the cradle during the takeoff from earth and journey to the parking orbit. These restraining mechanisms do not form a part of the present invention and have been more than adequately described in the cited prior art. For our purposes, a pyrotechnic device can be used to sever the restraints to release the spacecraft as shown in FIG. 3. The removal of the release mechanisms permits the spacecraft 4 to respond to the preloaded ejection spring and to rise and rotate until the spacecraft pivot lever member 10 contacts and/or reaches a force equilibrium with the pivot support assembly 12 and more particularly, the pivot seat member 14. An ejection restraint mechanism 16, such as an anchor rod and spring assembly, is connected between the spacecraft 4 and the cradle 6. The anchor rod can be attached to the spacecraft by a fitting (not shown) which allows the rod to slide and retract after cutting. The other end of the rod attaches to a spring housing (not shown) which is in turn, attached to the cradle 6. The spring assembly partially balances the pushoff spring of the ejection mechanism, to be described subsequently, to give a smooth motion after the cradle release mechanisms have been actuated.

The gyroscopic motion of the spacecraft helps to maintain adequate clearance as the spacecraft leaves the payload bay of the shuttle. The spin of the spacecraft 4 further insures propellant feed at the thrusters which are used subsequently for the additional spin up.

Figure 7:
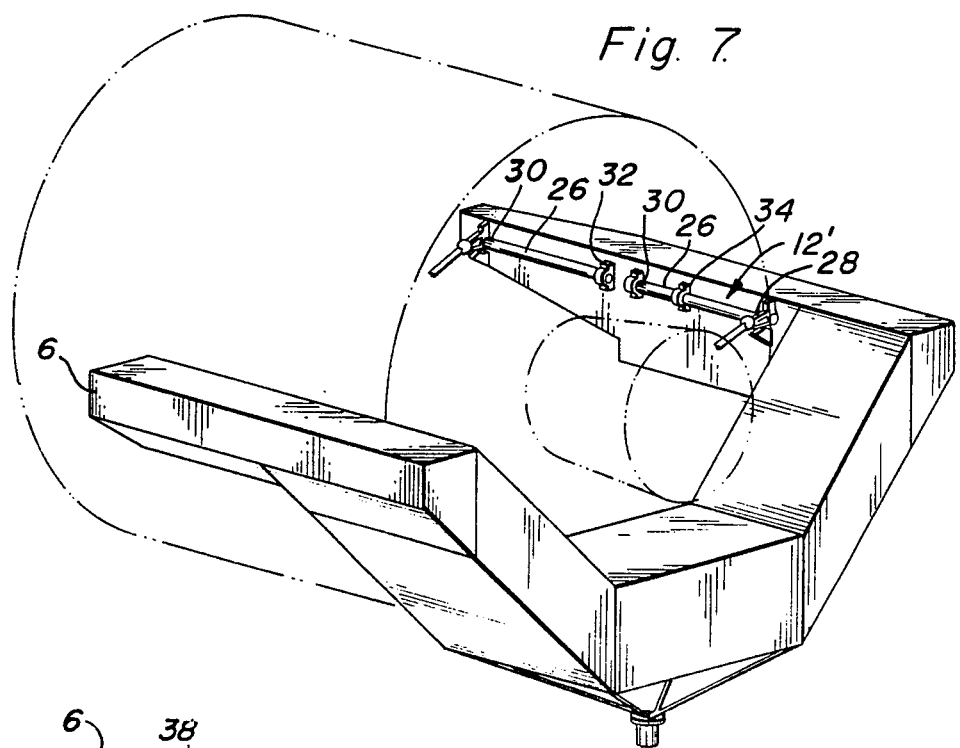
FIG. 7 is a perspective schematic view of an alternative embodiment of the present invention.

During the launching of the launch vehicle from earth, significant forces are exerted upon the spacecraft 4 and the cradle 6 and these forces are of such a magnitude that they can damage a pivot support assembly 12 that is being relied upon for the subsequent deployment of the spacecraft from the bay of the launch vehicle. Recognizing this problem, the designers have frequently left a gap between the pivot lever member 10 extending from the spacecraft and the pivot seat member 14 mounted on the cradle. In some cases, this pivot gap is sufficient to accommodate any relative movement that will occur during the launch, or even resulting from any stresses and temperature induced deformations on component parts of the cradle and spacecraft. In some designs, a portion of the spacecraft is cantilevered from the support cradle such as shown in FIG. 7, and the suspended mass can create relatively large movements during the takeoff from earth. In such designs, it is impractical to provide a large enough gap to accommodate such movement.

The present invention is functional in either event, that is whether a pivot gap is provided during the launch or the pivot lever is in direct contact with the seat member. There is, however, an additional advantage of the present invention in that the pivot seat member can be biased against the pivot lever during the launch phase without risking any damage. This biasing force will help eliminate any transient movements, particularly when the cradle release mechanisms are released preparatory for deployment of the spacecraft and offer the further advantage of removing the necessity of additional components such as the restraint mechanism 16.

Referring to FIG. 2, a plurality of cradle release mechanisms 18 (five are used but not all five are shown for ease of illustration) are utilized to hold the spacecraft, for example, through an integral carrier mentioned above, connected to moment-free ball fittings. Three of these cradle release mechanisms are attached to the sides and keel of the carrier ring, and the remaining two restrain the aft end. As shown in FIG. 3, the cradle restraint mechanisms have been removed and the spacecraft 4 is being restrained by the ejection restraint mechanism 16. The pivot lever member 10 is in contact with the pivot support assembly seat member 14. If a pivot gap were initially provided, the spring ejecting mechanism 8 would preliminarily rotate the spacecraft for pivot contact with the ejection restraint mechanism 16 limiting the travel. The spring ejecting mechanism 8 is capable of providing an after settling spring force of about 1300 pounds to supply the deployment energy. When the ejection restraint mechanism 16 has had its restraining member cut or severed, spring ejecting mechanism 8 can then deploy the spacecraft 4 with a linear and angular velocity as shown in FIG. 4.

Figure 5:
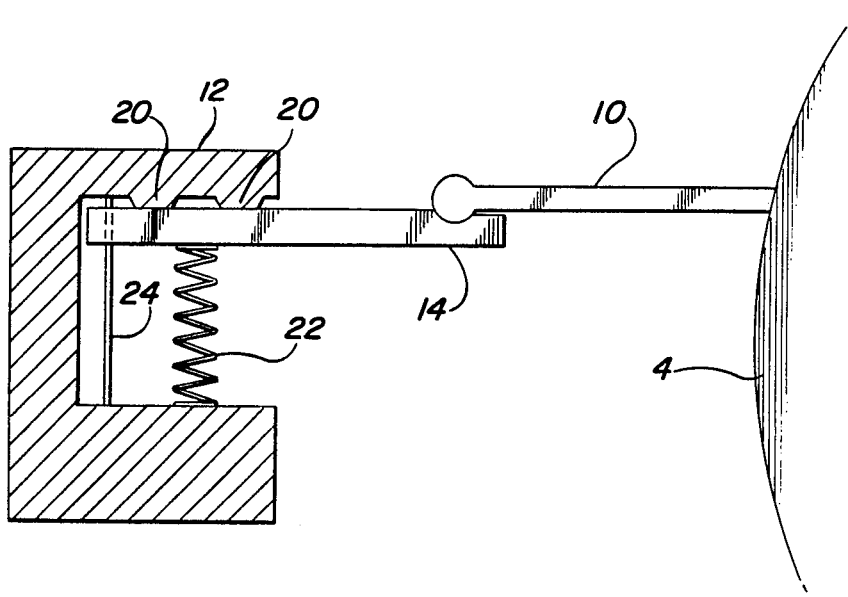
FIG. 5 is a schematic cross sectional view of the pivot support assembly during deployment of the spacecraft.

Referring to FIG. 5, a schematic of one embodiment of the present invention is disclosed wherein the pivot seat member 14 can be biased against stops 20 by a preloaded helical spring 22. A guide member 24 can be journalled in an aperture in the pivot seat member 14 to limit the movement to two directions.

Figure 6:
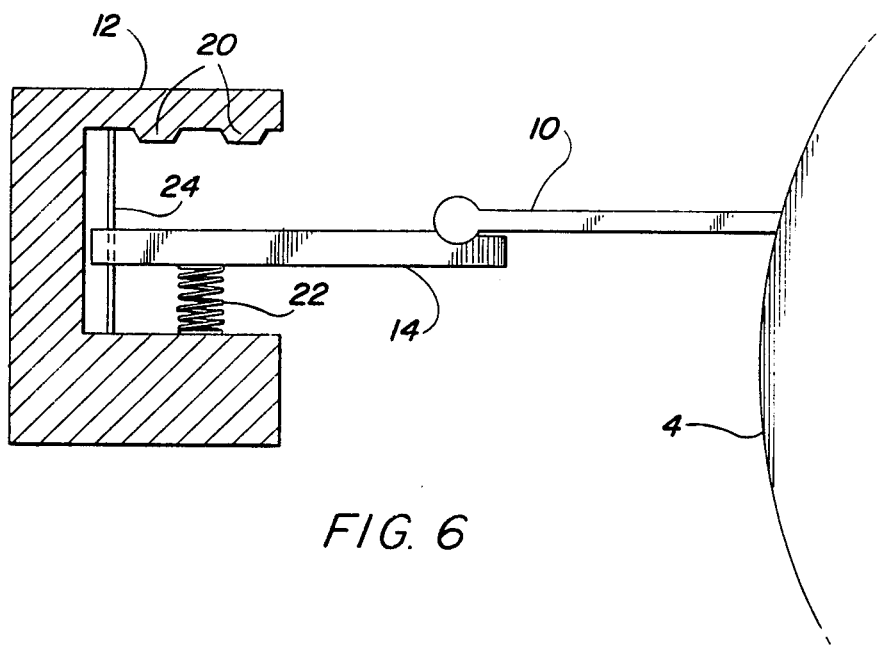
FIG. 6 is a schematic cross sectional view of the pivot support assembly subject to takeoff launch deflections.

Referring to FIG. 6, the launch deflection resulting from takeoff of the launch vehicle, can be accommodated by the flexibility of the pivot seat member 14 as it compresses the helical spring 22. As can be appreciated, the force generated by the helical spring 22 can be predetermined to a fixed amount. This fixed amount is at least greater than the deployment forces that will be experienced against the pivot seat member 14 when the spring ejecting mechanism 8 deploys the spacecraft 4 and less than the amount of force that will damage the pivot seat member 14 or the lever member 10.

Figure 8:
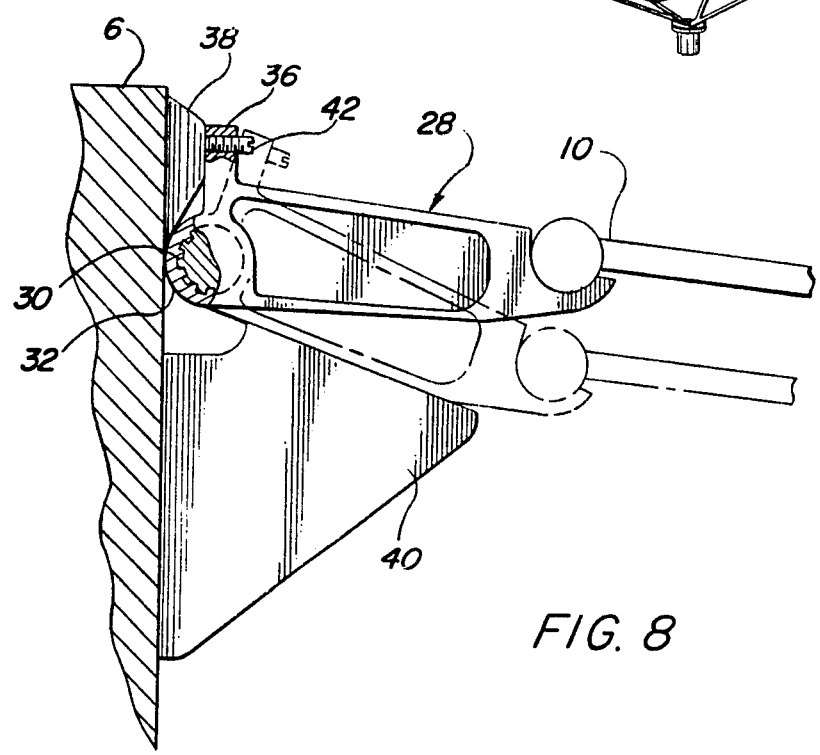
FIG. 8 is a plan view of the alternative torsion bar embodiment of the present invention.

Referring to FIGS. 7 and 8, another preferred embodiment of the present invention is disclosed wherein a pair of pivot support assemblies 12', each include a torsion bar 26 supporting a cantilevered seat member 28. One end of the torsion bar has splines 30 that are capable of being journalled within teeth in the mounting bracket 32. A rotational bearing member 34 supports the torsion bar 26 adjacent to seat member 28. The other end of the torsion bar 26 also has splines 30 which can be subjectively mounted within the teeth of the seat member 28. Each tooth increment provides a predetermined force increment that will be set during the initial mounting of the spacecraft 4 in the cradle 6 on earth. An arm member 36 extends upward from the cantilevered seat member 28 and interfaces with a corresponding stop 38. By adjustment of a stop member 42 mounted on the arm member 36, the force can be subjectively modified to a desired pre-load. Finally, an optional lower travel limiter 40 can define the limitation of the downward rotational movement of the cantilevered seat movement.

A pair of these torsion bar pivot support assemblies are utilized to provide a pair of pivot points. These pivot points are on the opposite side of the spacecraft from the spring ejecting mechanism and define a hypothetical triangle with the corner points of the triangle being the respective pivot points and the force vector of the spring ejection mechanism. The center of mass of the spacecraft will be located within this triangular configuration. The splines 30 permit adjustment to a desired spring force which will bear against the stop 38. Smaller adjustments in force and position can be provided by the stop member 42 which may preferably be a set screw. Thus, rotation of the torsion bar 26 after the initial engagement of the splines 30 in the mounting bracket 32 will preset a desired spring force.

As a result of the present invention, an improved pivot support assembly that provides a pivot seat member which is moveably connected to the cradle 6, is provided. Stops limit the movement of the seat member, while a helical spring or a torsion bar spring is utilized to bias a stop member to a position adjacent a stop. Other types of resilient mechanisms can be used. The spring force can be predetermined so that it holds the seat member against the stop during the deployment the spacecraft from a parking orbit. The pivot seat member, however, is capable of movement against the spring force when subject to greater forces, such as can be exerted during the actual launching of the launch vehicle from earth. Thus, an improved gyroscopic ejection of a spacecraft can be achieved with additional safety features that have heretofore not been possible.

It is understood that the above described embodiment of the invention is merely illustrative of the many possible specific embodiments which represent applications of the principles of the present inventions. Numerous and various other arrangements can readily be devised in accordance with these principles by those skilled in the art without the departing from the spirit and scope of the invention. For example, various spring mounting arrangements can be utilized other than the splines 30 and mounting bracket 32.

What is claimed is:

1. In an apparatus for the ejection of a spacecraft from a launching vehicle having a support structure with a supporting cradle, means for restraining the spacecraft to the cradle, at least one pivot point support member and an ejecting mechanism for imparting a force to one side of the spacecraft to provide a rotary movement about the pivot point support member during ejection, the improvement comprising:

a pivot support assembly including a pivot seat member movably connected to the cradle;

stop means for limiting movement of the seat member; and means for biasing the seat member to a position adjacent the stop means at a predetermined force sufficient to prevent movement of the pivot seat member during ejection of the spacecraft.

2. The invention of claim 1 further including a guide member restraining the direction of movement of the pivot seat member.

3. The invention of claim 1 wherein the pivot seat member is cantilevered from the cradle.

4. The invention of claim 1 wherein the means for biasing is a spring member.

5. The invention of claim 1 wherein the means for biasing is a torsion bar.

6. The invention of claim 1 wherein a pair of pivot support assemblies are provided.

7. The invention of claim 1 wherein the pivot seat member is adjacent to the spacecraft when it is mounted on the support structure and the means for biasing exerts a force against the stop means which is less than the force capable of being exerted on the seat member during the takeoff of the launching vehicle from earth, but greater than the force exerted on the seat member during a gyroscopic ejection.

8. In an apparatus for the gyroscopic ejection of a spacecraft in outer space from a launching vehicle having a support structure with a supporting cradle, means for restraining the spacecraft to the cradle, and an ejecting mechanism for imparting a tangential thrust force to one side of the spacecraft to provide a rotary movement during ejection, the improvement comprising:

a pivot support assembly including a pair of pivot seat members physically contacting predetermined points on the spacecraft and movably connected to the supporting cradle, the pivot seat members are spaced from each other and are on the opposite side of the spacecraft from the application of the tangential thrust force to the spacecraft so that the point of force application and the spatial position of the two pivot seat members would define the corners of a hypothetical triangle which would enclose the center of mass of the spacecraft;

stop means for limiting the movement of the respective seat members; and biasing means for biasing the respective seat members against the stop means with a directional force exerted on the seat member which is less than the maximum force capable of being exerted in the opposite direction during the takeoff of the launching vehicle from earth, but greater than the force exerted on the seat member during a gyroscopic ejection whereby, the pivot seat members can move to prevent damage during the takeoff but remain relatively rigid during the ejection of the spacecraft from the launching vehicle into outer space.

9. The invention of claim 8 wherein the means for biasing is a torsion bar.

10. The invention of claim 8 further including guide members restraining the movement of the pivot seat members.

11. The invention of claim 9 wherein the pivot seat members are cantilevered from the cradle.

12. The invention of claim 10 wherein the means for biasing is a spring member.

13. An improved spacecraft deployment system for the controlled release of a spacecraft such as a satellite into outer space comprising:

a launching vehicle for carrying a satellite into outer space;

a support structure mounted in the launching vehicle for removably supporting the satellite;

means for releasably restraining the satellite to the support structure;

an ejecting device for imparting a force on one side of the center of means of the spacecraft to provide a rotary movement to the spacecraft during ejection;

a pivot support assembly, including a pivot seat member capable of physically contacting the spacecraft on the opposite side of the center of mass relative to the application of an ejecting force, connected to the support structure, the pivot seat member is movably mounted on the support structure;

stop means for limiting the movement of the seat member; and biasing means for biasing the seat member against the stop means with a directional force exerted on the seat member which is less than the maximum force capable of being exerted in the opposite direction during the takeoff of the launching vehicle from earth, but greater than the force exerted on the seat member during ejection of the spacecraft from the launch vehicle whereby the seat member can move against the biasing means during the takeoff but will remain relatively rigid during the ejection of the spacecraft from the launching vehicle into outer space.

14. The invention of claim 13 further including a guide member restraining the movement of the pivot seat member.

15. The invention of claim 13 wherein the pivot seat member is cantilevered from the support structure.

16. The invention of claim 13 wherein the biasing means for biasing is a spring member.

17. The invention of claim 13 wherein the biasing means for biasing is a torsion bar.

18. The invention of claim 13 wherein a pair of pivot support assemblies are provided.

19. In an apparatus for the gyroscopic ejection of a spacecraft from a launching vehicle having a support structure, means for restraining the spacecraft to the support structure, at least one pivot point support member mounted on the support structure on one side of the spacecraft and an ejecting mechanism for imparting a force to the other side of the spacecraft to provide a rotary movement about the pivot point support member during ejection, the improvement of a pivot support assembly comprising:

a pivot seat member;

a torsion bar connected to the pivot seat member to permit movement;

means for connecting the torsion bar to the support structure; and stop means for limiting the movement of the seat member and to provide a predetermined bias force of sufficient force to prevent movement of the pivot seat member during ejection of the spacecraft.

20. The invention of claim 19 wherein the means for connecting the torsion bar includes a mounting bracket having a journalled grooved aperture and the torsion bar includes spline projections for interfacing with the journalled grooves to permit a specific force to be preset on the seat member.

21. A method of deploying a spacecraft into orbit from a launching vehicle that includes a pivot seat member contacting the spacecraft and cooperating with an ejecting mechanism for deployment of the spacecraft into outer space, comprising the following steps;

launching the launching vehicle with a spacecraft mounted therein from earth;

contacting the spacecraft with the pivot seat member during launching with an initial predetermined biasing force;

permitting the pivot seat member with the spacecraft to move, relative to the launching vehicle in response to the acceleration force created during launching, within a predetermined range of movement against a progressively increasing biasing force greater than the initial predetermined biasing force;

deploying the spacecraft from the launching vehicle into outer space with a rotational and translational force; and holding the pivot seat member relatively stationary with the launching vehicle during deployment with the initial predetermined biasing force being at least greater than the reaction force created against the seat member during deployment.

* * * * *